(12) United States Patent
Chen et al.

(10) Patent No.: US 12,222,764 B2
(45) Date of Patent: Feb. 11, 2025

(54) FOLDABLE DISPLAY DEVICE

(71) Applicant: SUZHOU CHINA STAR OPTOELECTRONICS TECHNOLOGY CO., LTD., Suzhou (CN)

(72) Inventors: Ce Chen, Suzhou (CN); Wenbing Zhang, Suzhou (CN); Feng Gao, Suzhou (CN); Shuai Zhang, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 95 days.

(21) Appl. No.: 17/789,886

(22) PCT Filed: Jun. 27, 2022

(86) PCT No.: PCT/CN2022/101664
§ 371 (c)(1),
(2) Date: Jun. 29, 2022

(87) PCT Pub. No.: WO2023/240677
PCT Pub. Date: Dec. 21, 2023

(65) Prior Publication Data
US 2023/0403349 A1 Dec. 14, 2023

(51) Int. Cl.
*G06F 1/16* (2006.01)
(52) U.S. Cl.
CPC .......... *G06F 1/1652* (2013.01); *G06F 1/1624* (2013.01); *G06F 1/1675* (2013.01)
(58) Field of Classification Search
CPC ............. H04M 1/0268; H04M 1/0216; H04M 1/0269; G06F 1/1624; G06F 1/1652; G06F 1/1675; G06F 1/1641; G06F 1/1681; G09F 9/301
See application file for complete search history.

(56) References Cited

U.S. PATENT DOCUMENTS 11,051,413 B2 * 6/2021 Yang ...................... G06F 1/1624
11,462,134 B2 * 10/2022 Zhang ................... G06F 1/1624
(Continued)

FOREIGN PATENT DOCUMENTS

CN    105518567 A    4/2016
CN    106940966 A    7/2017
(Continued)

OTHER PUBLICATIONS

PCT International Search Report for International Application No. PCT/CN2022/101664, mailed Nov. 25, 2022, 10pp.
(Continued)

*Primary Examiner* — Rockshana D Chowdhury
(74) *Attorney, Agent, or Firm* — The Roy Gross Law Firm, LLC; Roy Gross

(57) ABSTRACT

A foldable display device includes a first support member, a second support member rotatably connected to the first support member, a primary display screen, and a secondary display screen fixed on the second support member. The first support member includes a flat surface, and a first arc surface and a second arc surface respectively connected to opposite sides of the flat surface. The primary display screen includes first, second, and third primary display screens sequentially covering the flat surface, the first arc surface, and the second arc surface. When the secondary display screen is stored, the first, second, and third primary display screens and the secondary display screen form a 360° surround screen. When the secondary display screen is spread to a same plane as the first primary display screen, the first primary display screen and the secondary display screen form a spliced display screen.

18 Claims, 9 Drawing Sheets

(56) References Cited

U.S. PATENT DOCUMENTS

| | | | | |
|---|---|---|---|---|
| 11,516,325 B2* | 11/2022 | Liao | ............... | H04M 1/0268 |
| 11,720,147 B2* | 8/2023 | Prushinskiy | ......... | G06F 1/1624 |
| | | | | 361/679.27 |
| 11,853,120 B2* | 12/2023 | Jin | ..................... | G06F 1/1626 |
| 11,921,545 B2* | 3/2024 | Feng | ................. | H04M 1/0268 |
| 2012/0314399 A1* | 12/2012 | Bohn | ................. | H04M 1/0268 |
| | | | | 361/679.01 |
| 2021/0280095 A1 | 9/2021 | He | | |
| 2022/0039273 A1* | 2/2022 | Zhang | ............ | H04M 1/0237 |

FOREIGN PATENT DOCUMENTS

| | | |
|---|---|---|
| CN | 111179762 A | 5/2020 |
| CN | 111951692 A | 11/2020 |
| CN | 112652248 A | 4/2021 |
| CN | 112789573 A | 5/2021 |
| CN | 213365988 U | 6/2021 |
| CN | 214504274 U | 10/2021 |
| CN | 113938543 A | 1/2022 |
| CN | 113963625 A | 1/2022 |
| WO | 2015136403 A1 | 9/2015 |

OTHER PUBLICATIONS

PCT Written Opinion of the International Search Authority for International Application No. PCT/CN2022/101664, mailed Nov. 25, 8pp.

Chinese Office Action issued in corresponding Chinese Patent Application No. 202210670381.9 dated Jan. 5, 2023, pp. 1-12, 31pp.

\* cited by examiner

FOLDABLE DISPLAY DEVICE

CROSS REFERENCE TO RELATED APPLICATIONS

This application is a National Phase of PCT Patent Application No. PCT/CN2022/101664 having International filing date of Jun. 24, 2022, which claims the benefit of Chinese Patent Application No. 202210670381.9, filed Jun. 4, 2022, the contents of which are all incorporated herein by reference in their entirety.

FIELD OF INVENTION

The present disclosure relates to the technical field of display, and particularly to a foldable display device.

BACKGROUND

With the widespread use of flexible display screens, foldable display devices are provided with hinges, pillars, and other structures, so that a single flexible display screen can be folded, or multiple flexible display screens can be spliced and folded. In this way, a switch between a tablet mode and a mobile phone mode is realized, which is one of future directions of display technology.

A single flexible display screen generally bears pressure when folded inwards, and generally bears tension when folded outwards. The single flexible display screen is prone to obvious creases and imprints after being bent multiple times, resulting in a shortened service life of the flexible display screen.

Please refer to FIG. 1, two primary display screens 200 are folded through a foldable structure such as a hinge (not shown). No display screen is provided at the foldable structure, so the foldable structure between the two primary display screens 200 cannot display, which cannot meet user's demand for 360° surround screen display, resulting in a poor user experience.

Please refer to FIG. 2, two primary display screens 200 are spliced and folded through one secondary display screen 300. Although the secondary display screen 300 can display between the two primary display screens 200, it cannot meet user's demand for 360° surround screen display. Furthermore, Moreover, there are two seams 400 between the secondary display screen 300 and the two primary display screens 200, resulting in a poor user experience.

SUMMARY OF DISCLOSURE

A purpose of the present disclosure is to provide a foldable display device, which can solve problems in the prior art that a foldable display device has a short service life, cannot meet user's demand for 360° surround screen display, and has a poor user experience. In order to solve the above problems, the present disclosure provides a foldable display device comprising a first support member, a primary display screen, a second support member, and a secondary display screen. The first support member comprises a first flat surface, a second flat surface, a first arc surface, and a second arc surface. The second flat surface is parallel to the first flat surface. The first arc surface and the second arc surface connect the first flat surface and the second flat surface and extend along a first axis. The primary display screen is fixed on the first support member and comprises a first primary display screen, a second primary display screen, and a third primary display screen. The first primary display screen covers the first flat surface. The second primary display screen covers the first arc surface and is connected to one side of the first primary display screen. The third primary display screen covers the second arc surface and is connected to another side of the first primary display screen. The second support member is rotatably connected to the first support member. The secondary display screen is fixed on the second support member. When the secondary display screen is in a storage state, the first primary display screen, the second primary display screen, the third primary display screen, and the secondary display screen form a 360° surround screen. When the secondary display screen is spread to a same plane as the first primary display screen, the first primary display screen and the secondary display screen form a spliced display screen.

In an embodiment, a surface of the secondary display screen away from the second support member is tangent to a surface of the second primary display screen away from the first support member. When the secondary display screen is in the storage state, the secondary display screen is parallel to the first primary display screen, and the surface of the secondary display screen away from the second support member is tangent to the surface of the second primary display screen away from the first support member and a surface of the third primary display screen away from the first support member. When the secondary display screen is spread to the same plane as the first primary display screen, the surface of the secondary display screen away from the second support member is flush with a surface of the first primary display screen away from the first support member.

In an embodiment, the first support member is provided with a first through hole extending along the first axis. The foldable display device further comprises a rotating device configured to rotatably connect the second support member to the first support member. The rotating device comprises a rotating shaft, a connection base, a first gear, a second gear, and one or more third gears. The rotating shaft is disposed in the first through hole, is rotatably connected to the first support member, and extends along the first axis. The connection base is configured to fixedly connect the rotating shaft to the second support member. The connection base comprises a first connection base and a second connection base respectively fixed on the first end and the second end of the rotating shaft. The first gear is fixed on an outer wall of the first end of the rotating shaft. The second gear is fixed on an inner wall of the first through hole and surrounds the first gear. The third gears mesh with the first gear and the second gear.

In an embodiment, the rotating device further comprises a rotating disk rotatably sleeved on the rotating shaft and disposed between the first gear and the first connection base. The third gears are rotatably connected to a side of the rotating disk away from the first connection base. An axis of the first through hole, an axis of the rotating shaft, and an axis of the first arc surface coincide with each other.

In an embodiment, when the secondary display screen is spread, the rotating shaft rotates in a first direction, the first gear on the rotating shaft rotates in the first direction, the third gears rotate in a second direction relative to the rotating disk, and the rotating disk rotates in the first direction. When the secondary display screen is stored, the rotating shaft rotates in the second direction, the first gear on the rotating shaft rotates in the second direction, the third gears rotate in the first direction relative to the rotating disk, and the rotating disk rotates in the second direction. The first direction is one of a clockwise direction and a counterclockwise direction, and the second direction is other one of the clockwise direction and the counterclockwise direction.

In an embodiment, the third gears extend along the first axis, and each of the third gears is gradually thicker from an end of each of the third gears away from the first connection base to an end of each of the third gears close to the first connection base.

In an embodiment, the foldable display device further comprises a sliding device configured to drive the third gears to move along the first axis. The sliding device comprises one or more sliding blocks and a lifting disk. The sliding blocks slidably penetrate the first connection base. The lifting disk is slidably sleeved on the rotating shaft. The sliding blocks are rotatably connected to the lifting disk. The rotating disk is slidably sleeved on the rotating shaft and is rotatably connected to the lifting disk.

In an embodiment, the sliding device further comprises a knob rotatably connected to the first connection base and configured to drive the sliding blocks to move along the first axis. The sliding blocks are rotatably connected to the knob.

In an embodiment, when the knob is rotated in a first direction, the knob drives the sliding blocks to move away from the first connection base, and the sliding blocks drive the lifting disk, the rotating disk, and the third gears to move away from the first connection base. When the knob is rotated in a second direction, the knob drives the sliding blocks to move toward the first connection base, and the sliding blocks drive the lifting disk, the rotating disk, and the third gears to move toward the first connection base.

In an embodiment, the rotating shaft is provided with a second through hole extending along the first axis. An axis of the second through hole coincides with an axis of the first through hole. The foldable display device further comprises a stylus pen detachably disposed in the second through hole.

The present invention has the following advantages. In the present invention, the second support member is rotatably connected to the first support member through the rotating device, so as to realize spread or storage of the secondary display screen. When the secondary display screen is spread or stored, the first primary display screen, the second primary display screen, the third primary display screen, and the secondary display screen are not folded, which can avoid a phenomenon that a flexible display screen in the prior art forms obvious creases and imprints after being bent many times, thereby improving service lifes of the first primary display screen, the second primary display screen, the third primary display screen, and the secondary display screen.

In the present invention, when the secondary display screen is in the storage state, the first primary display screen, the second primary display screen, the third primary display screen, and the secondary display screen form the 360° surround screen, which can meet user's demand for 360° surround screen display and improve user experience.

In the present invention, when the secondary display screen is spread to the same plane as the first primary display screen, the surface of the secondary display screen away from the second support member is tangent to the surface of the second primary display screen away from the first support member, and the surface of the secondary display screen away from the second support member is flush with the surface of the first primary display screen away from the first support member, so that the first primary display screen and the secondary display screen form the spliced display screen. This meets the demand for large-size flat display. Furthermore, there is only one seam between the first primary display screen and the secondary display screen, which can improve the user experience.

In the present invention, the third gears extend along the first axis, and each of the third gears is gradually thicker from the end of each of the third gears away from the first connection base to the end of each of the third gears close to the first connection base. The sliding device drives the third gears to move away from the first connection base along the first axis, so as to increase a meshing degree between the third gears and the first gear and a meshing degree between the third gears and the second gear, thereby increasing resistance of spreading or storing the secondary display screen, so that the secondary display screen can be maintained at any rotation angle.

In the present invention, the rotating shaft is provided with the second through hole extending along the first axis, so as to reduce a weight of the foldable display device. The second through hole may be configured to accommodate components such as a stylus pen and wires.

BRIEF DESCRIPTION OF DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

Figure 1:
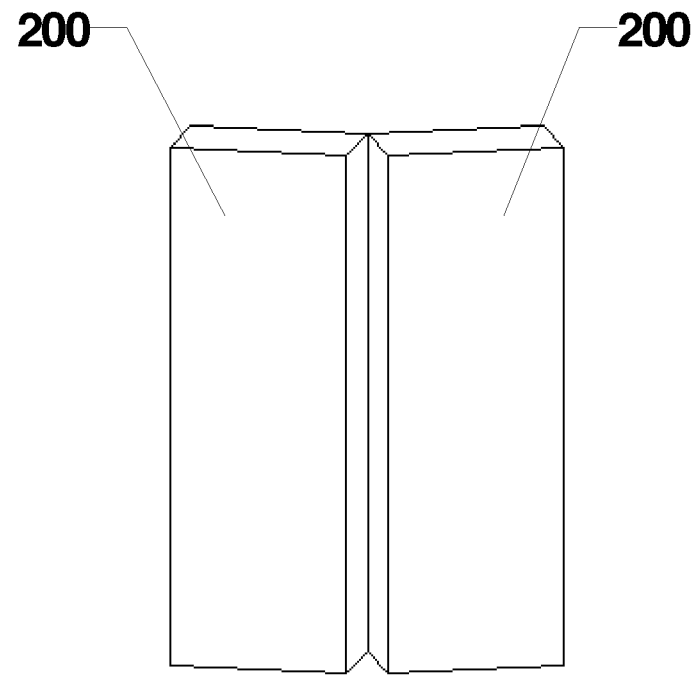
FIG. 1 is a schematic structural diagram of a type of foldable display device in the prior art.
Figure 2:
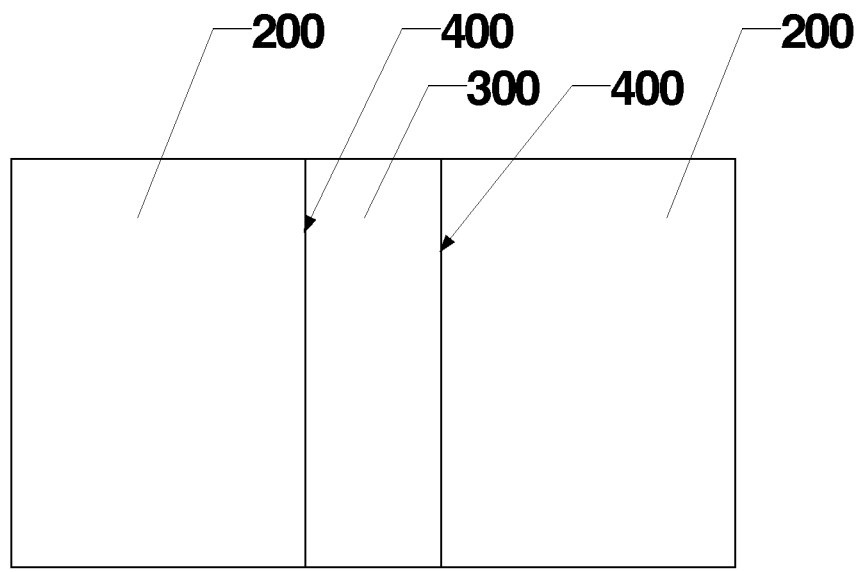
FIG. 2 is a schematic structural diagram of another type of foldable display device in the prior art.

The above drawings have the following reference numerals:

1: first support member, 2: primary display screen, 3: second support member, 4: secondary display screen, 5: rotating device, 6: sliding device, 7: stylus, 11: first flat surface, 12: second flat surface, 13: first arc surface, 14: second arc surface, 15: first through hole, 21: first primary display screen, 22: second primary display screen, 23: The third primary display screen, 51: rotating shaft, 52: connection base, 53: first gear, 54: second gear, 55: third gear, 56: rotating disk, 511: second through hole, 521, first connection base, 522, second connection base, 61: sliding block, 62: lifting disk, and 63: knob.

DETAILED DESCRIPTION

Preferred embodiments of the present disclosure are described in detail below with reference to accompanying drawings to fully introduce technical solutions of the present disclosure to those skilled in the art and to prove that the present invention can be implemented. This makes the technical solutions of the present disclosure clearer and those skilled in the art will more readily understand how to implement the present invention. However, the present invention may be implemented in many different forms of embodiments, so the claimed scope of the present invention is not limited to the embodiments mentioned herein, and the description of the embodiments below is not intended to limit the claimed scope of the present invention.

Directional terms mentioned in the present disclosure, such as "above", "below", "front", "back", "left", "right", "inside", "outside", "side", are merely used to indicate directions of the accompanying drawings. The directional terms used herein are used for explaining and illustrating the present invention rather than limiting the claimed scope of the present invention.

In the accompanying drawings, components having a same structure are indicated by a same reference numeral, and components having similar structures or functions are indicated by similar reference numerals. Furthermore, for ease of understanding and description, dimensions and thickness of each component shown in the accompanying drawings are arbitrarily shown, and the dimensions and thickness of each component are not limited in the present disclosure.

Embodiment 1

Figure 3:
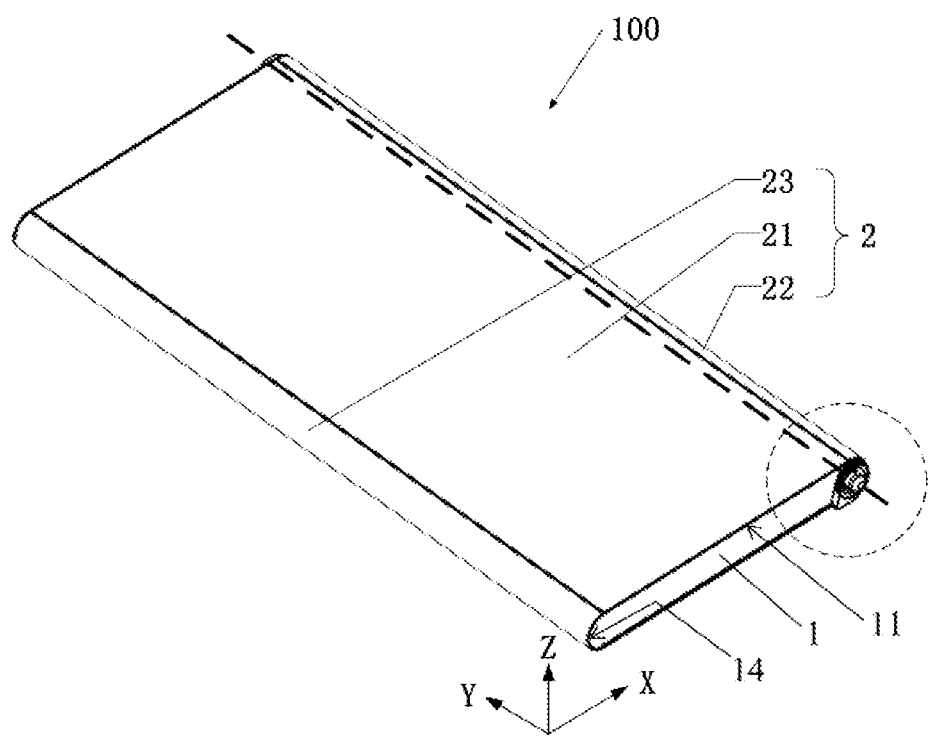
FIG. 3 is a schematic structural diagram of a foldable display device according to an embodiment of the present disclosure, wherein a secondary display screen is in a storage state.
Figure 5:
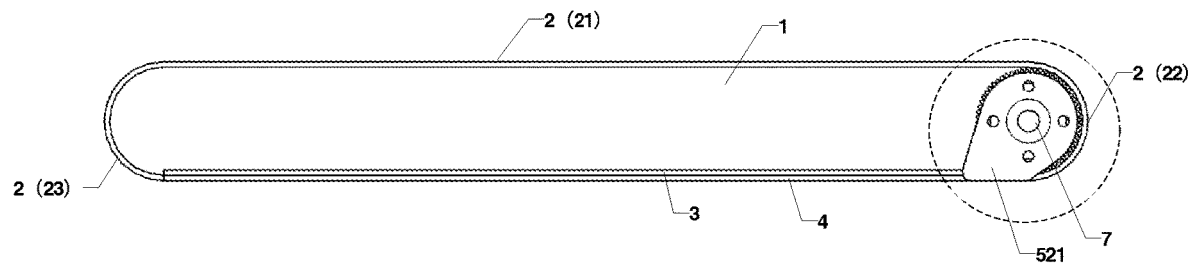
FIG. 5 is a front view of the foldable display device according to an embodiment of the present disclosure, wherein the secondary display screen is in the storage state.
Figure 9:
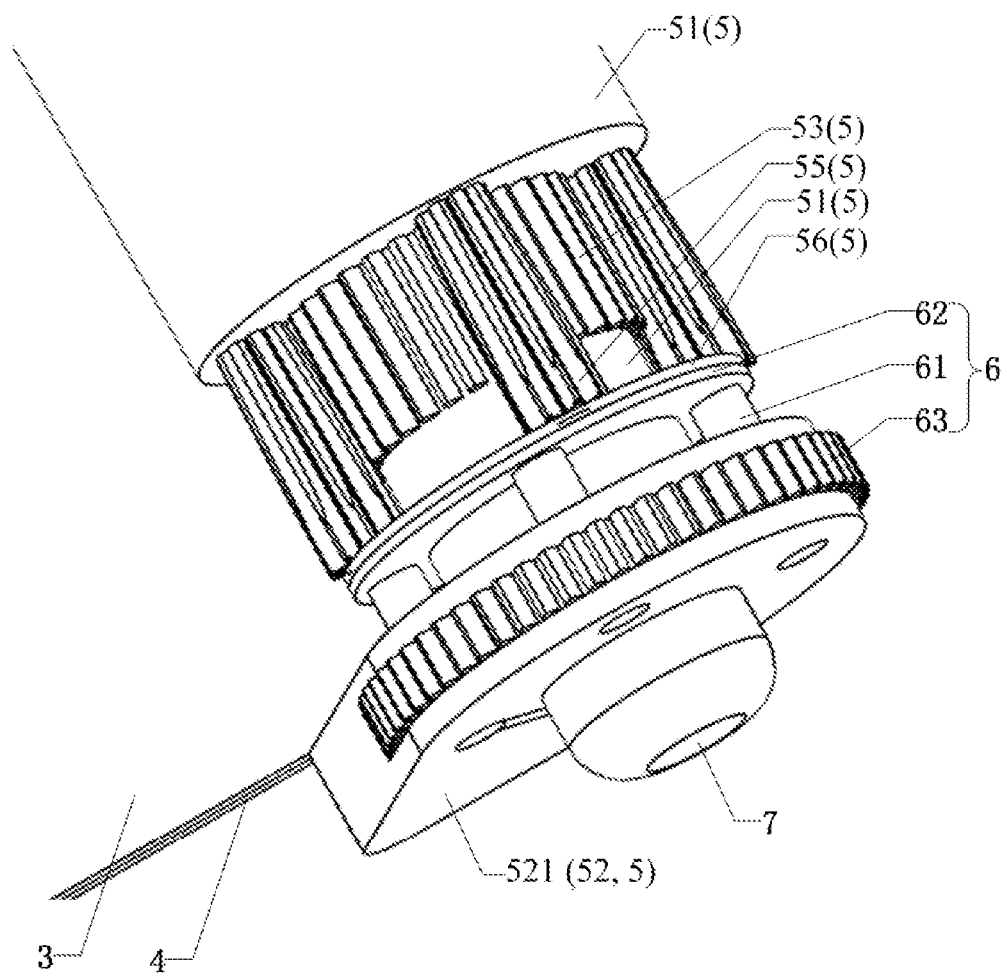
FIG. 9 is a partial enlarged view of a rotating device, a sliding device, a second support member, and the secondary display screen in an encircled part of FIG. 3.

Please refer to FIG. 3, FIG. 5, and FIG. 9, this embodiment provides a foldable display device 100. The foldable display device 100 includes a first support member 1, a primary display screen 2, a second support member 3, a secondary display screen 4, a rotating device 5, and a sliding device 6.

Figure 8:
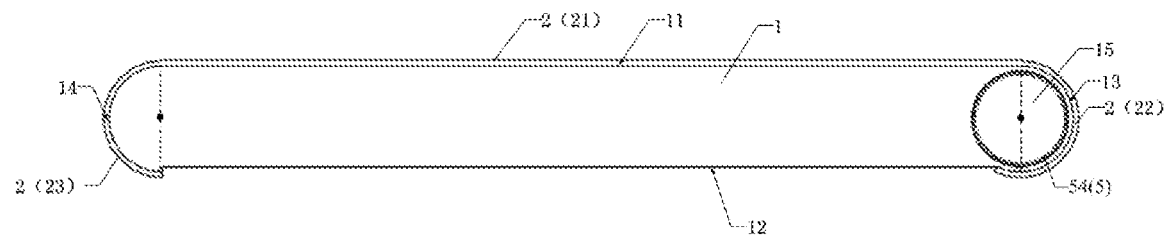
FIG. 8 is a front view of a first support member and the first primary display screen of the foldable display device according to an embodiment of the present disclosure.

Please refer to FIG. 8, the first support member 1 comprises a first flat surface 11, a second flat surface 12, a first arc surface 13, and a second arc surface 14. The second flat surface 12 is parallel to the first flat surface 11. The first arc surface 13 and the second arc surface 14 connect the first flat surface 11 and the second flat surface 12.

Please refer to FIG. 3 and FIG. 8. The first flat surface 11 includes two first sides and two second sides, and the two first sides are perpendicular to the two second sides. The first arc surface 13 and the second arc surface 14 extend from the two first sides respectively. The two first sides are parallel to a first axis, and the two second sides are parallel to a second axis. The first axis is perpendicular to the second axis. That is, the first arc surface 13 and the second arc surface 14 extend along the first axis. In this embodiment, the first axis is a Y axis, and the second axis is an X axis. That is, the first arc surface 13 and the second arc surface 14 extend along the Y axis. A third axis perpendicular to the first flat surface 11 is a Z axis.

As shown in FIG. 3 and FIG. 8, in any cross section formed by the X axis and Z axis, an arc radius of the first arc surface 13 is equal to an arc radius of the second arc surface 14, and a line connecting an arc center of the first arc surface 13 and an arc center of the second arc surface 14 is parallel to the first flat surface 11.

As shown in FIG. 3 and FIG. 8, the first support member 1 is provided with a first through hole 15 extending along the Y axis. An axis of the first through hole 15 coincides with an axis of the first arc surface 13. The axis of the first through hole 15 refers to a line connecting two circle centers of the first through hole 15 in any two cross section formed by the X axis and Z axis. The axis of the first arc surface 13 refers to a line connecting two arc centers of the first arc surface 13 in any two cross section formed by the X axis and Z axis.

As shown in FIG. 3 and FIG. 8, the primary display screen 2 is fixed on the first support member 1. The primary display screen 2 is a flexible display screen. The primary display screen 2 includes a first primary display screen 21, a second primary display screen 22, and a third primary display screen 23. The second primary display screen 22 and the third primary display screen 23 are respectively connected to opposite sides of the first primary display screen 21. The first primary display screen 21, the second primary display screen 22, and the third primary display screen 23 are an integrated structure.

As shown in FIG. 3 and FIG. 8, the first primary display screen 21 covers the first flat surface 11. The first primary display screen 21 is a flat display screen.

As shown in FIG. 3 and FIG. 8, the second primary display screen 22 covers the first arc surface 13, and the second primary display screen 22 is an arc-shaped body. In any cross section formed by the X axis and Z axis, an arc center of the second primary display screen 22 coincides with the arc center of the first arc surface 13.

As shown in FIG. 3 and FIG. 8, the third primary display screen 23 covers the second arc surface 14, and the third primary display screen 23 is an arc-shaped body. In any cross section formed by the X axis and Z axis, an arc center of the third primary display screen 23 coincides with the arc center of the second arc surface 14.

Figure 6:
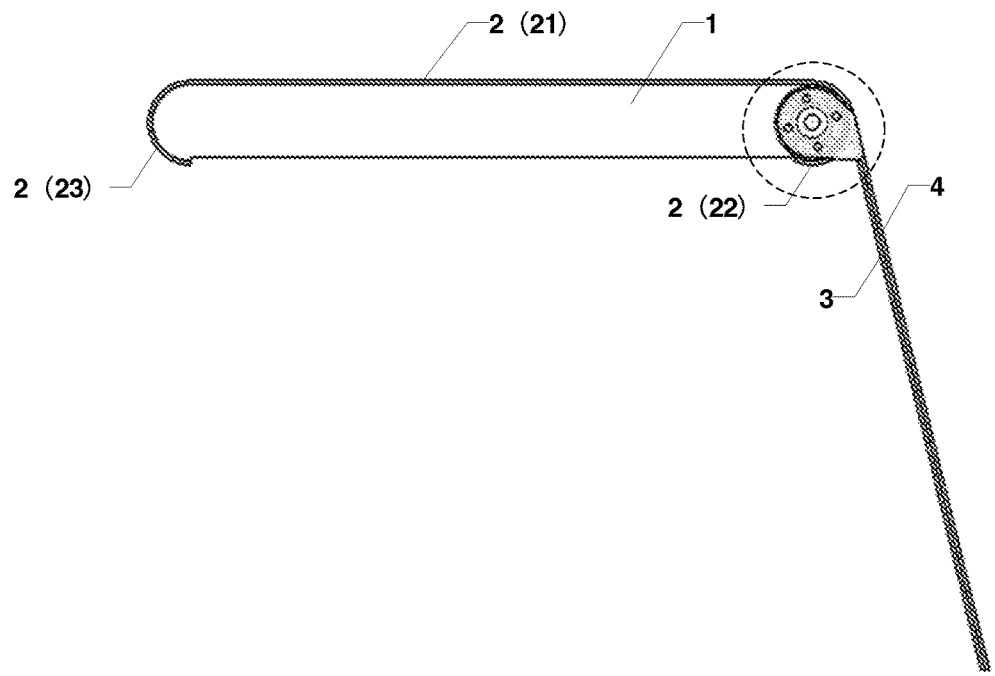
FIG. 6 is a front view of the foldable display device according to an embodiment of the present disclosure, wherein the secondary display screen is spread but not spread to the same plane as the first primary display screen.
Figure 7:
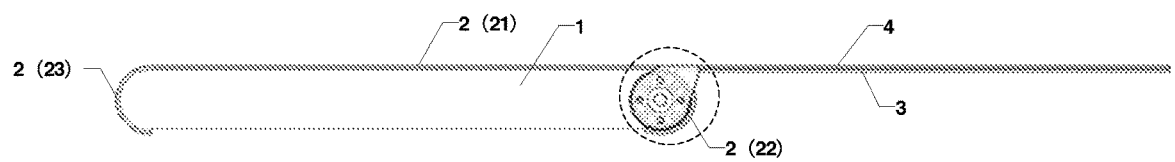
FIG. 7 is a front view of the foldable display device according to an embodiment of the present disclosure, wherein the secondary display screen is spread to the same plane as the first primary display screen.

As shown in FIG. 5, FIG. 6, and FIG. 7, the second support member 3 is rotatably connected to the first support member 1. The secondary display screen 4 is fixed on the second support member 3. The second support member 3 is rotatably connected to the first support member 1, so that the secondary display screen 4 can be spread or stored. When the secondary display screen 4 is spread or stored, the first primary display screen 21, the second primary display screen 22, the third primary display screen 23, and the secondary display screen 4 are not folded, which can avoid a phenomenon that a flexible display screen in the prior art forms obvious creases and imprints after being bent many times, thereby improving service lifes of the first primary display screen 21, the second primary display screen 22, the third primary display screen 23, and the secondary display screen 4. Ultimately, a service life of the foldable display device 100 is improved.

As shown in FIG. 5, FIG. 6, and FIG. 7, a surface of the secondary display screen 4 away from the second support member 3 is tangent to a surface of the second primary display screen 22 away from the first support member 1. Because the secondary display screen 4 of the present disclosure does not need to be folded, the secondary display screen 4 may be a flexible display screen or a non-flexible display screen.

As shown in FIG. 5, when the secondary display screen 4 is in the storage state, the first primary display screen 21, the second primary display screen 22, the third primary display screen 23, and the secondary display screen 4 form a 360° surround screen, which can meet user's demand for 360° surround screen display and improve user experience.

Figure 10:
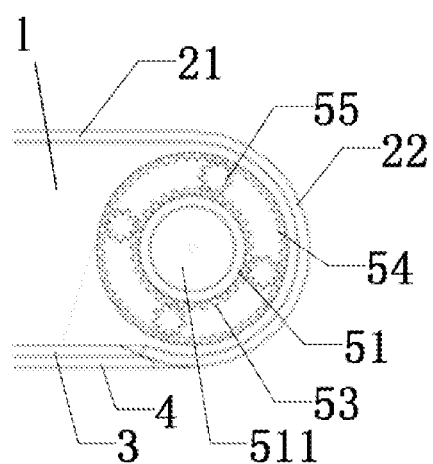
FIG. 10 is a partial enlarged view of a first gear, a second gear, third gears, the secondary display screen, and the primary display screen in an encircled part of FIG. 5.

As shown in FIG. 5 and FIG. 10, when the secondary display screen 4 is in the storage state, the secondary display screen 4 is parallel to the first primary display screen 21, and the surface of the secondary display screen 4 away from the second support member 3 is tangent to the surface of the second primary display screen 22 away from the first support member 1 and a surface of the third primary display screen 23 away from the first support member 1. This can prevent the secondary display screen 4 from being convex or concave, resulting in poor user experience.

As shown in FIG. 7, when the secondary display screen 4 is spread to a same plane as the first primary display screen 21, the first primary display screen 21 and the secondary display screen 4 form a spliced display screen. This can meet the demand for large-size flat display and improve the user experience.

Figure 12:
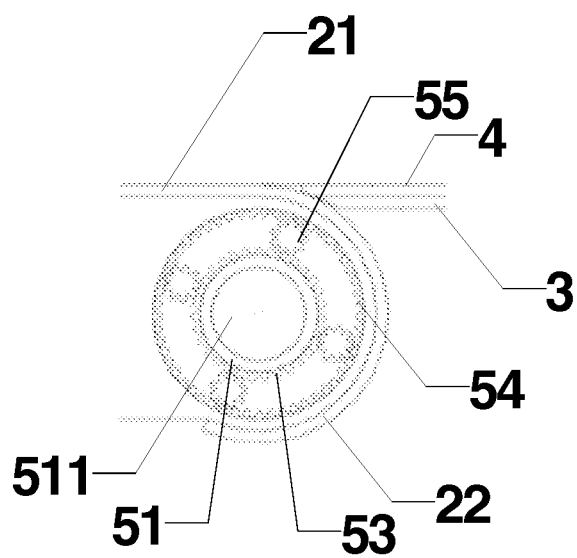
FIG. 12 is a partial enlarged view of the first gear, the second gear, the third gears, the secondary display screen, and the primary display screen in an encircled part of FIG. 7.

As shown in FIG. 7 and FIG. 12, when the secondary display screen 4 is spread to the same plane as the first primary display screen 21, the surface of the secondary display screen 4 away from the second support member 3 is flush with a surface of the first primary display screen 21 away from the first support member 1. This can avoid that the secondary display screen 4 and the first primary display screen 21 are not on a same plane, resulting in poor user experience.

Figure 11:
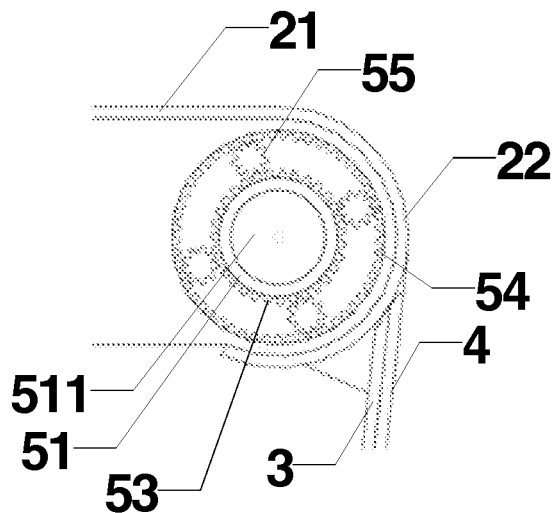
FIG. 11 is a partial enlarged view of the first gear, the second gear, the third gears, the secondary display screen, and the primary display screen in an encircled part of FIG. 6.

As shown in FIG. 6 and FIG. 11, when the secondary display screen 4 is spread but not spread to the same plane as the first primary display screen 21, the secondary display screen 4 covers a part of the second primary display screen 22 below. As shown in FIG. 7 and FIG. 12, when the secondary display screen 4 is spread to the same plane as the first primary display screen 21, the secondary display screen 4 covers an entire of the second main display screen 22 below. At this time, when a user views the first primary display screen 21 and the secondary display screen 4 from above, there is only one seam between the first primary display screen 21 and the secondary display screen 4, which can improve the user experience.

As shown in FIG. 8, FIG. 9, and FIG. 10, the rotating device 10 is configured to rotatably connect the second support member 3 to the first support member 1. The rotating device 5 comprises a rotating shaft 51, a connection base 52, a first gear 53, a second gear 54, one or more third gears 55, and a rotating disk 56.

The rotating shaft 51 is disposed in the first through hole 15, is rotatably connected to the first support member 1, and extends along the Y axis. An axis of the rotating shaft 51 coincides with the axis of the first through hole 15.

Figure 4:
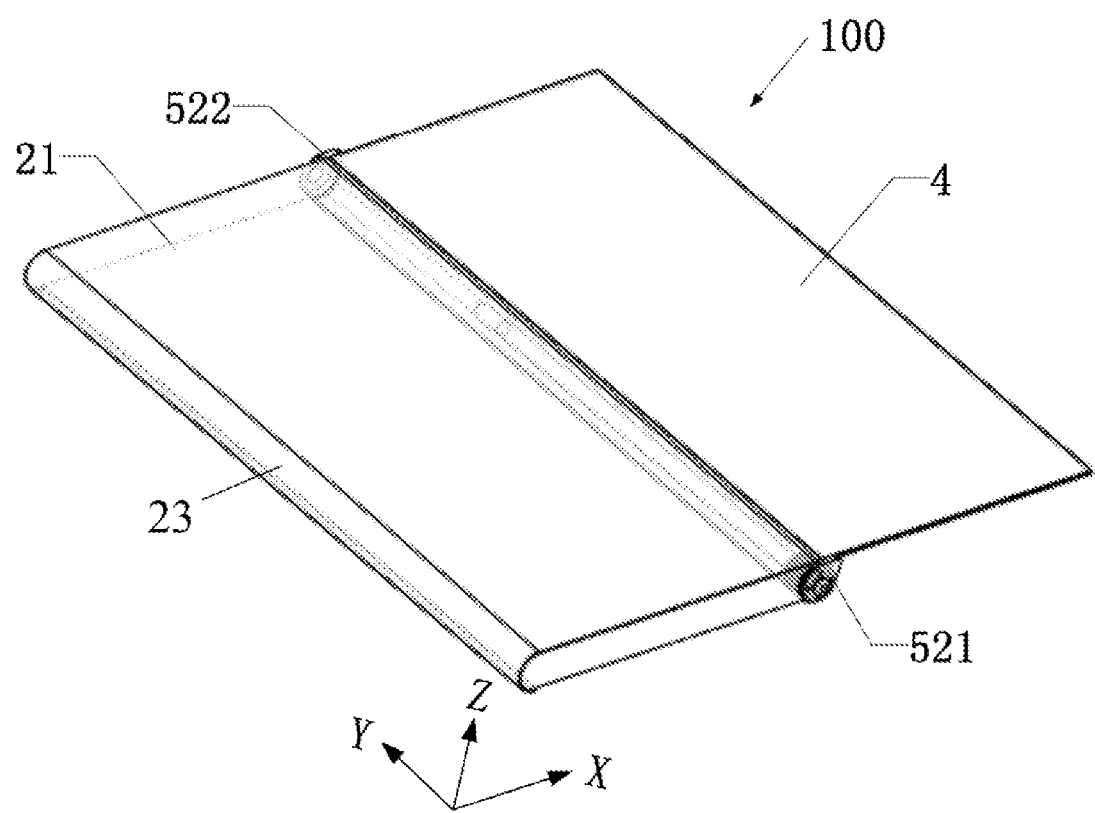
FIG. 4 is a schematic structural diagram of the foldable display device according to an embodiment of the present disclosure, wherein the secondary display screen is spread to a same plane as a first primary display screen.

As shown in FIG. 4 and FIG. 9, the connection base 52 is configured to fixedly connect the rotating shaft 51 to the second support member 3. The connection base 52 comprises a first connection base 521 and a second connection base 522 respectively fixed on a first end and a second end of the rotating shaft 51.

As shown in FIG. 9, FIG. 10, FIG. 11, and FIG. 12, the first gear 53 is fixed on an outer wall of the first end of the rotating shaft 53.

As shown in FIG. 8, FIG. 10, FIG. 11, and FIG. 12, the second gear 54 is fixed on an inner wall of the first through hole 15 and surrounds the first gear 53.

As shown in FIG. 9, FIG. 10, FIG. 11, and FIG. 12, in this embodiment, the rotating device 5 includes four third gears 55. The third gears 55 mesh with the first gear 53 and the second gear 54. In this embodiment, the third gears 55 are rotatably connected to a side of the rotating disk 56 away from the first connection base 521. In other embodiments, the third gears 55 may be fixed to the side of the rotating disk 56 away from the first connection base 521.

As shown in FIG. 9, the rotating disk 56 is rotatably sleeved on the rotating shaft 51 and is disposed between the first gear 53 and the first connection base 521.

Please refer to FIG. 5 to FIG. 12, when the secondary display screen 4 is spread, the rotating shaft 51 rotates in a first direction, the first gear 53 on the rotating shaft 51 rotates in the first direction, the third gears 55 rotate in a second direction relative to the rotating disk 56, and the rotating disk 56 rotates in the first direction. When the secondary display screen 4 is stored, the rotating shaft 51 rotates in the second direction, the first gear 53 on the rotating shaft 51 rotates in the second direction, the third gears 55 rotate in the first direction relative to the rotating disk 56, and the rotating disk 56 rotates in the second direction. The first direction is one of a clockwise direction and a counterclockwise direction, and the second direction is other one of the clockwise direction and the counterclockwise direction. In this embodiment, the first direction is the counterclockwise direction, and the second direction is the clockwise direction.

Figure 13:
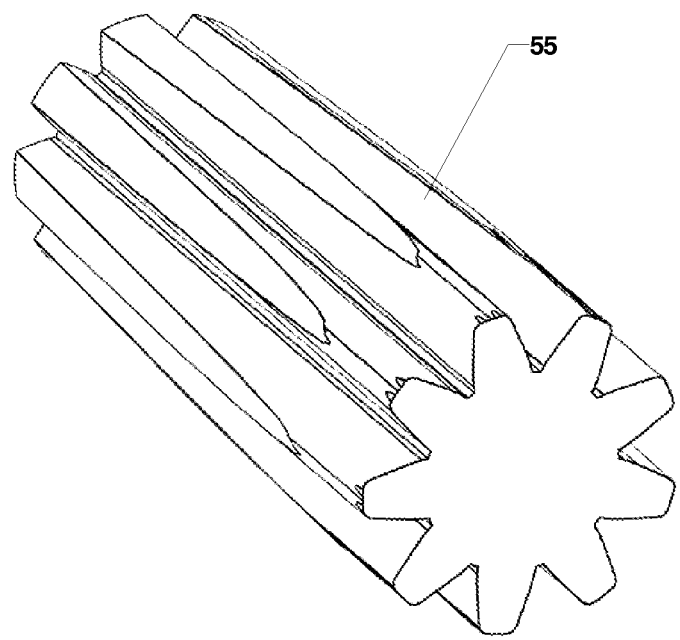
FIG. 13 is a schematic structural diagram of the third gear.

As shown in FIG. 9 and FIG. 13, the third gears 55 extend along the Y axis, and each of the third gears 55 is gradually thicker from an end of each of the third gears 55 away from the first connection base 521 to an end of each of the third gears 55 close to the first connection base 521. Therefore, when the third gears 55 move away from the first connection base 521, a meshing between the third gears 55 and the first gear 53 is tighter, and a meshing between the third gears 55 and the second gear 54 is tighter, so that resistance of spreading or storing the secondary display screen 4 is greater, which is beneficial to keep the secondary display screen 4 at any rotation angle.

Figure 14:
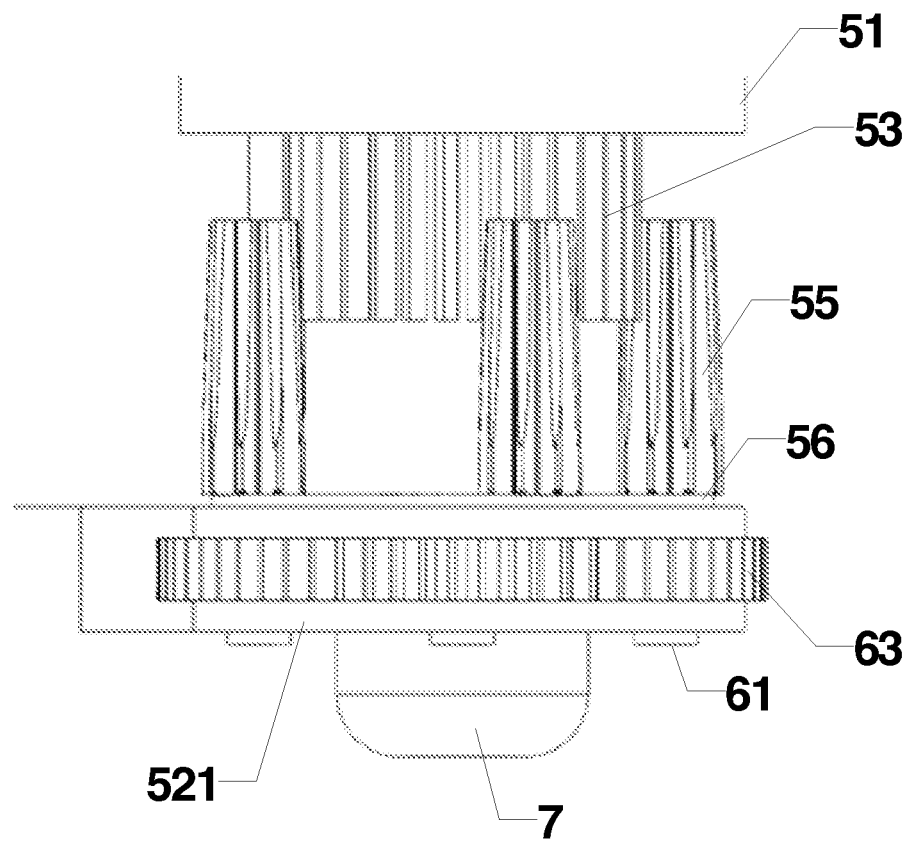
FIG. 14 is a schematic structural diagram of the sliding device and the third gears in a low resistance mode.
Figure 15:
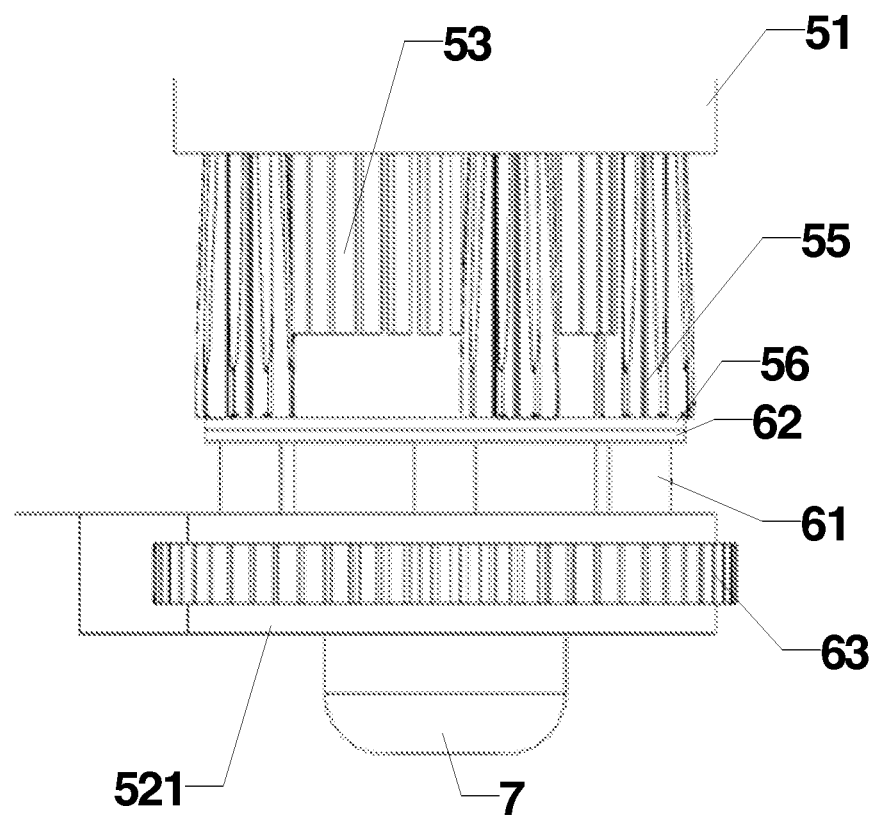
FIG. 15 is a schematic structural diagram of the sliding device and the third gears in a high resistance mode.

As shown in FIG. 9, FIG. 14, and FIG. 15, the sliding device 6 is configured to drive the third gears 55 to move along the Y axis. The sliding device 6 comprises one or more sliding blocks 61, a lifting disk 62, and a knob 53.

The sliding blocks 61 slidably penetrate the first connection base 521. The sliding blocks 61 are rotatably connected to the lifting disk 62. The sliding blocks 61 are rotatably connected to the knob 63.

The lifting disk 62 is slidably sleeved on the rotating shaft 51.

The rotating disk 56 is slidably sleeved on the rotating shaft 51 and is rotatably connected to the lifting disk 62. Therefore, the rotating disk 56 can be driven by the lifting disk 62 to move along the Y axis, and can rotate relative to the lifting disk 62 around the rotating shaft 51.

The knob 63 is rotatably connected to the first connection base 521. The knob 63 is mainly configured to drive the sliding blocks 61 to move along the Y axis.

Please refer to FIG. 9 and FIG. 15, when the knob 63 is rotated in the first direction, the knob 63 drives the sliding blocks 61 to move away from the first connection base 521. Specifically, the knob 63 drives the sliding blocks 61 to rotate, and the sliding blocks 61 moves away from the first connection base 521 while rotating. The sliding blocks 61 drive the lifting disk 62, the rotating disk 56, and the third gears 55 to move away from the first connection base 521, which increases a meshing degree between the third gears 55 and the first gear 53 and a meshing degree between the third gears 55 and the second gear 54, thereby increasing the resistance of spreading or storing the secondary display screen 4, so that the secondary display screen 4 can be maintained at any rotation angle.

Please refer to FIG. 9 and FIG. 14, when the knob 63 is rotated in the second direction, the knob 63 drives the sliding blocks 61 to move toward the first connection base 521. Specifically, the knob 63 drives the sliding blocks 61 to rotate, and the sliding blocks 61 moves toward the first connection base 521 while rotating. The sliding blocks 61 drive the lifting disk 62, the rotating disk 56, and the third gears 55 to move toward the first connection base 521, which decreases a meshing degree between the third gears 55 and the first gear 53 and a meshing degree between the third gears 55 and the second gear 54, thereby decreasing the resistance of spreading or storing the secondary display screen 4. This is beneficial to adjust a rotation angle of the secondary display screen 4.

As shown in FIG. 10 to FIG. 12, the rotating shaft 51 is provided with a second through hole 511 extending along the Y axis, so as to reduce a weight of the foldable display device 100. In this embodiment, an axis of the second through hole 511 coincides with the axis of the first through hole 15. The axis of the second through hole 511 refers to a line connecting two circle centers of the second through hole 511 in any two cross section formed by the X axis and Z axis. Please refer to FIG. 9 to FIG. 12, in this embodiment, the second through hole 511 is configured for placing a stylus pen 7, which improves space utilization of the second through hole 511. In other embodiments, the second through hole 511 may also be configured for placing components such as wires.

The foldable display device provided by the embodiments of the present disclosure is described in detail above. The present disclosure uses specific examples to describe principles and embodiments of the present invention. The above description of the embodiments is only for helping to understand solutions of the present invention and its core ideas. Furthermore, those skilled in the art may make modifications to the specific embodiments and applications according to ideas of the present invention. In conclusion, the present specification should not be construed as a limitation to the present invention.

What is claimed is:

1. A foldable display device, comprising:
    a first support member comprising a first flat surface, a second flat surface, a first arc surface, and a second arc surface, wherein the second flat surface is parallel to the first flat surface, and the first arc surface and the second arc surface connect the first flat surface and the second flat surface and extend along a first axis;
    a primary display screen fixed on the first support member and comprising a first primary display screen covering the first flat surface, a second primary display screen covering the first arc surface and connected to one side of the first primary display screen, and a third primary display screen covering the second arc surface and connected to another side of the first primary display screen;
    a second support member rotatably connected to the first support member; and
    a secondary display screen fixed on the second support member;
    wherein when the secondary display screen is in a storage state, the first primary display screen, the second primary display screen, the third primary display screen, and the secondary display screen form a 360° surround screen;
    when the secondary display screen is spread to a same plane as the first primary display screen, the first primary display screen and the secondary display screen form a spliced display screen;
    wherein the first support member is provided with a first through hole extending along the first axis; and
    the foldable display device further comprising:
        a rotating device configured to rotatably connect the second support member to the first support member and comprising:
            a rotating shaft disposed in the first through hole, rotatably connected to the first support member, extending along the first axis, and comprising a first end and a second end;
            a connection base configured to fixedly connect the rotating shaft to the second support member, and comprising a first connection base and a second connection base respectively fixed on the first end and the second end of the rotating shaft;
            a first gear fixed on an outer wall of the first end of the rotating shaft;
            a second gear fixed on an inner wall of the first through hole and surrounding the first gear; and
            one or more third gears meshing with the first gear and the second gear.

2. The foldable display device according to claim 1, wherein a surface of the secondary display screen away from the second support member is tangent to a surface of the second primary display screen away from the first support member.

3. The foldable display device according to claim 2, wherein when the secondary display screen is in the storage state, the secondary display screen is parallel to the first primary display screen, and the surface of the secondary display screen away from the second support member is tangent to the surface of the second primary display screen away from the first support member and a surface of the third primary display screen away from the first support member.

4. The foldable display device according to claim 3, wherein when the secondary display screen is spread to the same plane as the first primary display screen, the surface of the secondary display screen away from the second support member is flush with a surface of the first primary display screen away from the first support member.

5. The foldable display device according to claim 1, wherein an axis of the first through hole coincides with an axis of the first arc surface.

6. The foldable display device according to claim 1, wherein the rotating device further comprises:
   a rotating disk rotatably sleeved on the rotating shaft and disposed between the first gear and the first connection base, wherein the third gears are rotatably connected to a side of the rotating disk away from the first connection base.

7. The foldable display device according to claim 1, wherein an axis of the rotating shaft coincides with an axis of the first arc surface.

8. The foldable display device according to claim 6, wherein when the secondary display screen is spread, the rotating shaft rotates in a first direction, the first gear on the rotating shaft rotates in the first direction, the third gears rotate in a second direction relative to the rotating disk, and the rotating disk rotates in the first direction.

9. The foldable display device according to claim 8, wherein when the secondary display screen is stored, the rotating shaft rotates in the second direction, the first gear on the rotating shaft rotates in the second direction, the third gears rotate in the first direction relative to the rotating disk, and the rotating disk rotates in the second direction.

10. The foldable display device according to claim 9, wherein the first direction is one of a clockwise direction and a counterclockwise direction, and the second direction is other one of the clockwise direction and the counterclockwise direction.

11. The foldable display device according to claim 6, wherein the third gears extend along the first axis, and each of the third gears is gradually thicker from an end of each of the third gears away from the first connection base to an end of each of the third gears close to the first connection base.

12. The foldable display device according to claim 11, further comprising:
   a sliding device configured to drive the third gears to move along the first axis and comprising:
   one or more sliding blocks slidably penetrating the first connection base; and
   a lifting disk slidably sleeved on the rotating shaft, wherein the sliding blocks are rotatably connected to the lifting disk, and the rotating disk is slidably sleeved on the rotating shaft and is rotatably connected to the lifting disk.

13. The foldable display device according to claim 12, wherein the sliding device further comprises:
   a knob rotatably connected to the first connection base and configured to drive the sliding blocks to move along the first axis, wherein the sliding blocks are rotatably connected to the knob.

14. The foldable display device according to claim 13, wherein when the knob is rotated in a first direction, the knob drives the sliding blocks to move away from the first connection base, and the sliding blocks drive the lifting disk, the rotating disk, and the third gears to move away from the first connection base.

15. The foldable display device according to claim 14, wherein when the knob is rotated in a second direction, the knob drives the sliding blocks to move toward the first connection base, and the sliding blocks drive the lifting disk, the rotating disk, and the third gears to move toward the first connection base.

16. The foldable display device according to claim 1, wherein the rotating shaft is provided with a second through hole extending along the first axis.

17. The foldable display device according to claim 16, wherein an axis of the second through hole coincides with an axis of the first through hole.

18. The foldable display device according to claim 16, further comprising:
   a stylus pen detachably disposed in the second through hole.

* * * * *